(12) United States Patent
Pursifull et al.

(10) Patent No.: US 11,066,065 B2
(45) Date of Patent: Jul. 20, 2021

(54) METHODS AND SYSTEM FOR REPOSITIONING A VEHICLE

(71) Applicant: Ford Global Technologies, LLC, Dearborn, MI (US)

(72) Inventors: Ross Pursifull, Dearborn, MI (US); Joseph Lyle Thomas, Holt, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 16/244,694

(22) Filed: Jan. 10, 2019

(65) Prior Publication Data

US 2020/0223428 A1 Jul. 16, 2020

(51) Int. Cl.
*B60W 20/40* (2016.01)
*B60K 6/26* (2007.10)
(Continued)

(52) U.S. Cl.
CPC .............. *B60W 20/40* (2013.01); *B60K 6/26* (2013.01); *B60K 6/30* (2013.01); *B60K 6/46* (2013.01); *B60W 10/02* (2013.01); *B60W 10/023* (2013.01); *B60W 10/06* (2013.01); *B60W 10/08* (2013.01); *B60W 10/10* (2013.01); *B60W 10/18* (2013.01); *B60W 10/30* (2013.01); *B60W 30/18027* (2013.01); *B60W 50/00* (2013.01); *F02N 11/00* (2013.01); *F02N 11/003* (2013.01); *F02N 11/0855* (2013.01); *B60K 2006/268* (2013.01); *B60W 2050/0001* (2013.01); *B60W 2710/021* (2013.01); *B60W 2710/06* (2013.01); *B60W 2710/10* (2013.01);
(Continued)

(58) Field of Classification Search
CPC .... B60W 20/40; B60W 10/023; B60W 10/06; B60W 10/08; B60W 10/30; B60W 30/18027; B60W 10/02; B60W 10/10; B60W 10/18; B60W 50/00; B60W 2050/0001; B60W 2710/021; B60W 2710/06; B60W 2710/10; B60W 2710/18; B60K 6/26; B60K 6/30; B60K 6/46; B60K 2006/268; F02N 11/0855; F02N 11/003; F02N 11/00; F02N 2200/0804; F02N 15/02; F02N 2200/0802
See application file for complete search history.

(56) References Cited

U.S. PATENT DOCUMENTS 3,493,066 A * 2/1970 Dooley ................. B60K 6/105
                    180/165
3,882,950 A * 5/1975 Strohlein ............... B60K 6/105
                    180/165

(Continued)

OTHER PUBLICATIONS

Cunningham, R. et al., "Systems and Methods for Reducing Engine Compression Torque," U.S. Appl. No. 16/165,855, filed Oct. 19, 2018, 75 pages.

*Primary Examiner* — Russell Frejd
(74) *Attorney, Agent, or Firm* — Geoffrey Brumbaugh; McCoy Russell LLP (57) ABSTRACT

Systems and methods for operating a vehicle that includes a starter motor are described. In one example, the starter motor may engage a flywheel of an engine and rotate the engine without starting the engine in response to a request to move the vehicle without starting the engine. The starter motor may provide the propulsive force to move the vehicle a short distance.

14 Claims, 4 Drawing Sheets

(51) Int. Cl.
- *B60K 6/30* (2007.10)
- *F02N 11/08* (2006.01)
- *F02N 11/00* (2006.01)
- *B60K 6/46* (2007.10)
- *B60W 10/02* (2006.01)
- *B60W 10/18* (2012.01)
- *B60W 50/00* (2006.01)
- *B60W 10/06* (2006.01)
- *B60W 10/30* (2006.01)
- *B60W 30/18* (2012.01)
- *B60W 10/08* (2006.01)
- *B60W 10/10* (2012.01)
- *F02N 15/02* (2006.01)

(52) U.S. Cl.
CPC .......... *B60W 2710/18* (2013.01); *F02N 15/02* (2013.01); *F02N 2200/0802* (2013.01); *F02N 2200/0804* (2013.01)

(56) References Cited

U.S. PATENT DOCUMENTS

| | | | | |
|---|---|---|---|---|
| 4,416,360 A | * | 11/1983 | Fiala | B60K 17/02 477/5 |
| 2004/0173393 A1 | * | 9/2004 | Man | B60K 6/48 180/65.21 |
| 2010/0101522 A1 | * | 4/2010 | Ge | F02N 19/005 123/179.3 |

* cited by examiner

METHODS AND SYSTEM FOR REPOSITIONING A VEHICLE

FIELD

The present description relates to methods and a system for adjusting a position of a vehicle.

BACKGROUND AND SUMMARY

A vehicle may include an engine that is stopped and restarted to move the vehicle. The engine may be efficient to move the vehicle when the vehicle is driven over longer distances. However, if the vehicle is repositioned for a short distance (e.g. less than 20 meters), the engine may consume more fuel than is desired to move the vehicle the short distance. In addition, restarting the vehicle to move the vehicle a short distance may increase vehicle emissions more than may be desired. If the vehicle is a hybrid vehicle, the vehicle's electric motor may propel the vehicle for a short distance. However, if the vehicle is not a hybrid vehicle, then starting the engine may be the only option to reposition the vehicle under the vehicle's own propulsion system. Accordingly, it may be desirable to provide a way of repositioning a vehicle that is not a hybrid vehicle without having to restart the vehicle's engine.

The inventors herein have recognized the above-mentioned issues and have developed a vehicle operating method, comprising: adjusting a position of a starter pinion and closing a torque converter clutch via a controller in response to a request to move a vehicle without starting an engine of the vehicle.

By adjusting a position of a starter pinion and closing a torque converter clutch, it may be to provide the technical result of moving a vehicle without starting an engine when the vehicle is not a hybrid vehicle. In particular, the starter pinion may be extended to engage a pinion gear to an engine's flywheel so that a starter may rotate the engine. The torque converter clutch may be fully closed and locked while the starter motor is rotating, thereby rotating the transmission input shaft. The vehicle wheels may be rotated via the starter motor via engaging first gear. In this way, a vehicle may be repositioned without starting an engine via a starter motor.

The present description may provide several advantages. In particular, the approach may reduce vehicle emissions when a vehicle is moved a short distance. Further, the approach may reduce vehicle noise when a vehicle is moved a short distance. In addition, the approach may allow a vehicle to move short distances if an engine of the vehicle is in a degraded state.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a vehicle. In particular, the present description is related to moving a vehicle without assistance of an internal combustion engine. The vehicle may include an engine of the type shown in FIG. 1. The engine may be included in a driveline as shown in FIG. 2. The vehicle may operate according to the sequence of FIG. 3. The vehicle may be operated according to the method of FIG. 4 to reduce engine emissions and fuel consumption.

Figure 1:
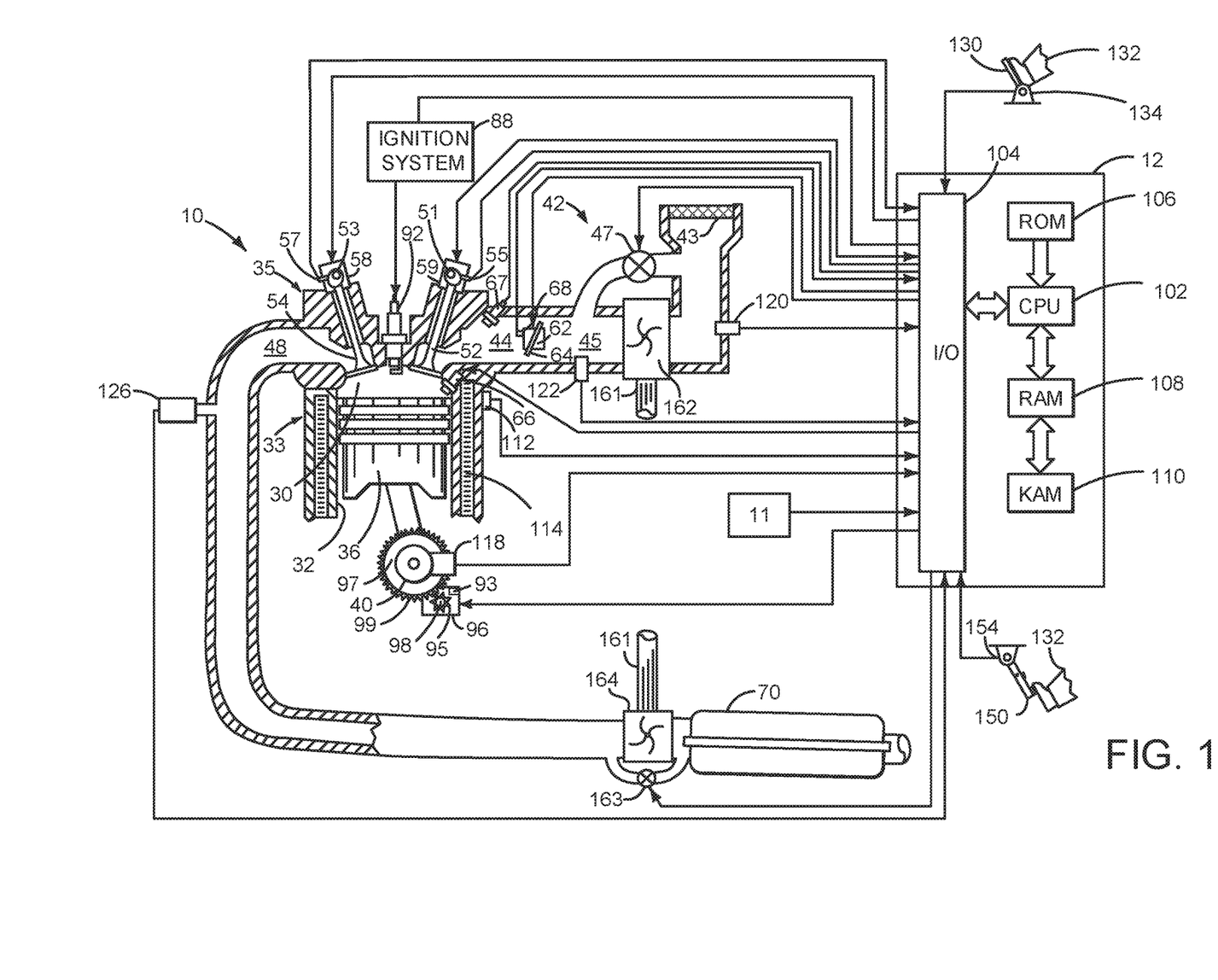
FIG. 1 is a schematic diagram of an engine.
Figure 2:
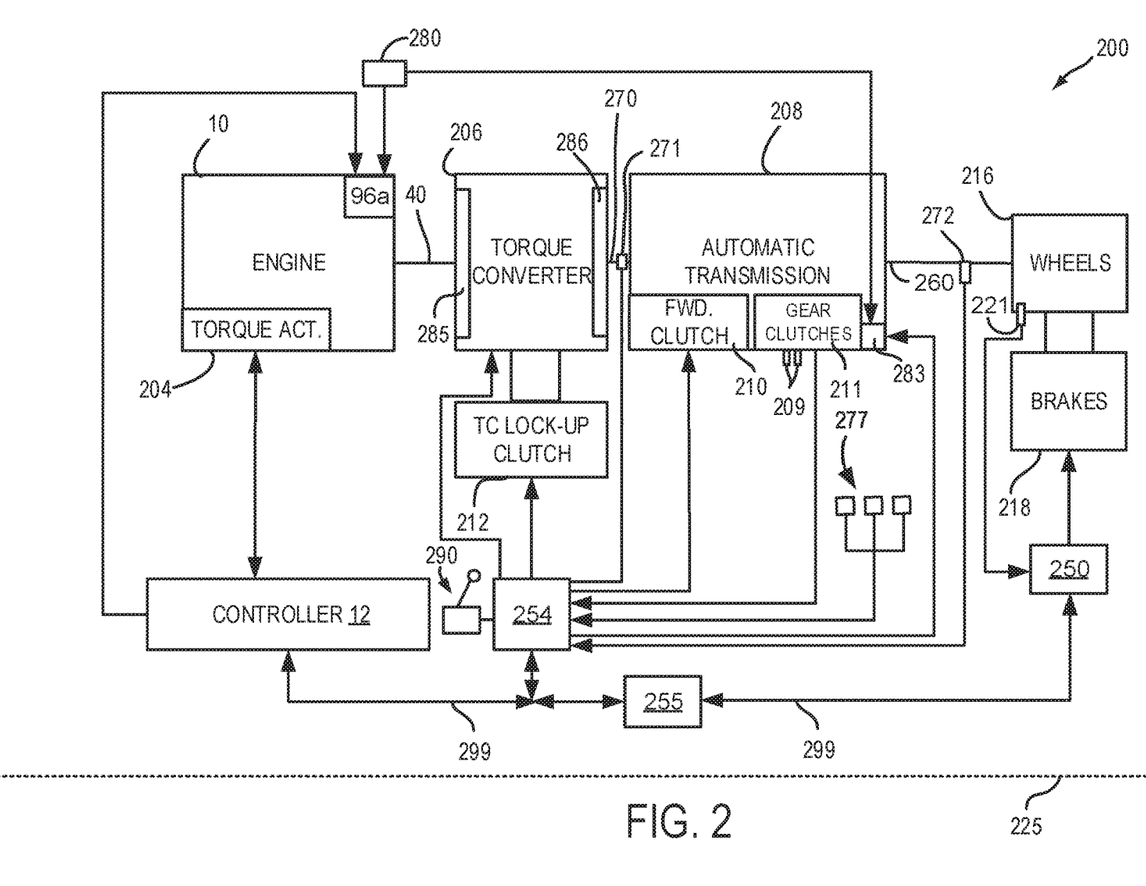
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions. In some examples, controller 255 may operate as an autonomous driver, thereby generating engine torque requests, transmission gear shifts, and vehicle braking demands or requests.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from engine controller 12, thereby providing a desired driveline braking power at vehicle wheels 216. Vehicle system controller 255 may also request a friction braking power via brake controller 250. The braking powers may be referred to as negative powers since they may slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

In this example, powertrain 200 may be powered by engine 10. Engine 10 may be started with an engine starting system shown in FIG. 1. Further, power of engine 10 may be adjusted via power or torque actuator 204, such as a fuel injector, throttle, etc. Low voltage battery 280 selectively supplies electrical energy to starter motor 96a. Starter motor 96a may rotate pinion gear 95. Engine 10 supplies torque to torque converter 206 via crankshaft 40. Torque converter 206 includes a turbine 286 to output power to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits power from engine crankshaft 40 to automatic transmission 208 via fluid transfer between the torque converter turbine 286 and torque converter impeller 285, thereby enabling power multiplication. In contrast, when torque converter lock-up clutch 212 is fully engaged, the power from the engine crankshaft is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Transmission 208 also includes an electric transmission pump 283 that pressurizes fluid to operate the forward clutch 210 and gear clutches 211. Pump 283 may be selectively activated and deactivated via transmission controller 254 responsive to vehicle operating conditions. Automatic transmission 208 also includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216 via hydraulic pressure that may be supplied via electric transmission pump 283. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or torque request from an accelerator pedal or other device. Vehicle system controller 255 then requests engine torque or power via engine controller 12. If the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft torque and vehicle speed.

In response to a request to decelerate vehicle 225, vehicle system controller 255 may provide a negative desired wheel power (e.g., desired or requested powertrain wheel power) based on vehicle speed and brake pedal position. Vehicle system controller 255 then allocates a fraction of the negative desired wheel power to the engine 10. Vehicle system controller may also allocate a portion of the requested braking power to friction brakes 218 (e.g., desired friction brake wheel power). Further, vehicle system controller may notify transmission controller 254 that the vehicle is in braking mode so that transmission controller 254 shifts gears 211 based on a unique shifting schedule to increase engine braking efficiency. Engine 10 may supply a negative power to transmission input shaft 270, but negative power provided by engine 10 may be limited by transmission controller 254 which outputs a transmission input shaft negative power limit (e.g., not to be exceeded threshold value). Any portion of desired negative wheel power that may not be provided by engine 10 may be allocated to friction brakes 218 so that the desired wheel power is provided by a combination of negative power (e.g., power absorbed) via friction brakes 218 and engine 10.

Accordingly, power control of the various powertrain components may be supervised by vehicle system controller 255 with local power control for the engine 10, transmission 208, and brakes 218 that may be provided via engine controller 12, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), gear shift lever sensors, and ambient temperature sensors. Transmission controller 254 may also receive requested gear input from gear shift selector 290 (e.g., a human/machine interface device). Gear shift lever may include positions for gears 1-N (where N is the an upper gear number), D (drive), and P (park)

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255.

Thus, the system of FIGS. 1 and 2 provides for a system, comprising: an engine including a starter, the starter including a pinion and a pinion gear; a torque converter including a torque converter clutch, the torque converter coupled to the engine; and a controller including executable instructions stored in non-transitory memory to adjust a position of the pinion of the starter in response to a request to move a vehicle a short distance without starting the engine. The system further comprises additional instructions to activate an electric pump of a transmission in response to the request to move the vehicle a short distance without starting the engine. The system further comprises additional instructions to rotate the engine without supplying fuel to the engine while the pinion is engaging the pinion gear to a flywheel. The system includes where the engine is rotated via the starter. The system further comprises adjusting the position of the pinion of the starter in response to a request to end the move of the vehicle.

Figure 3:
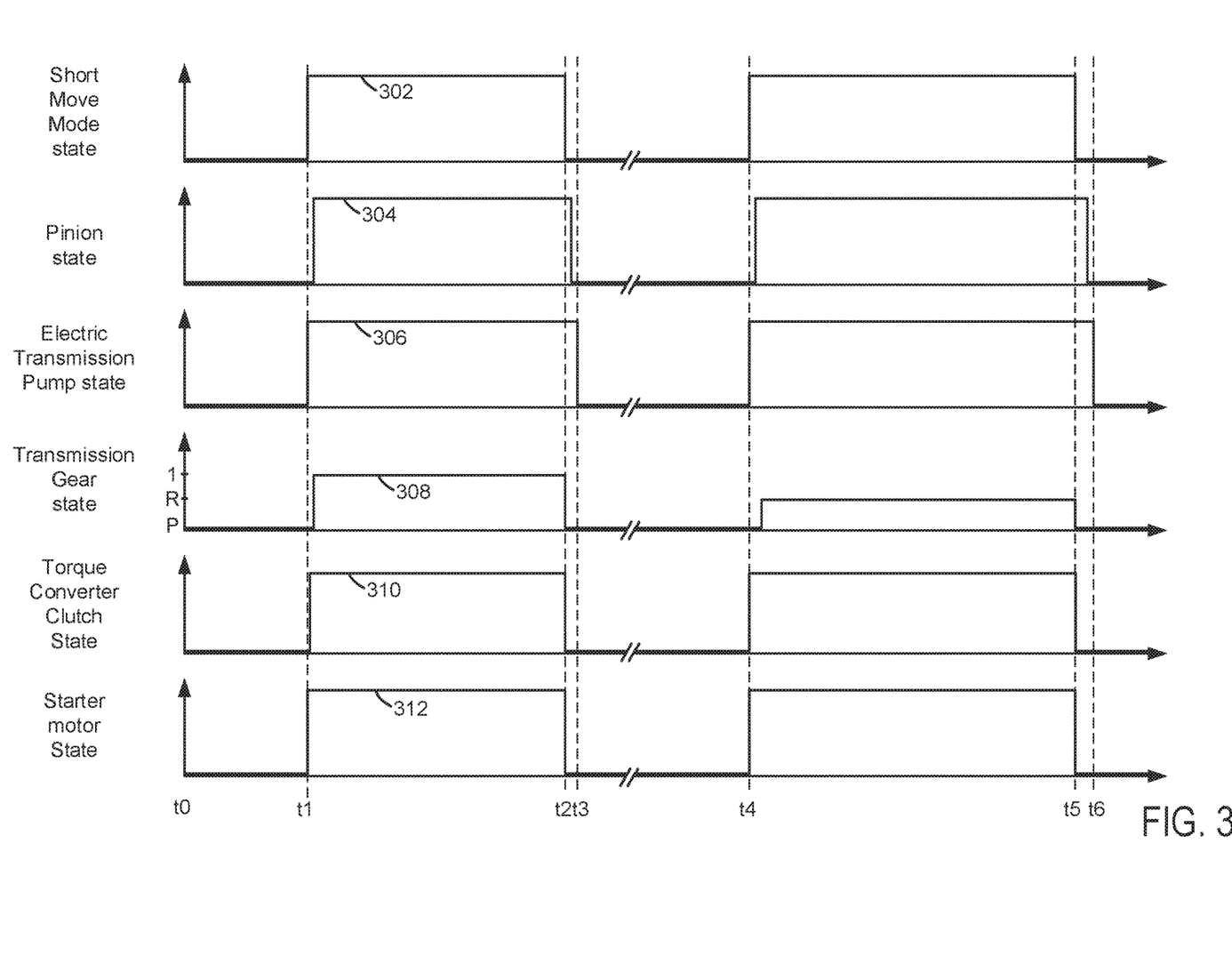
FIG. 3 shows a vehicle operating sequence.
Figure 4:
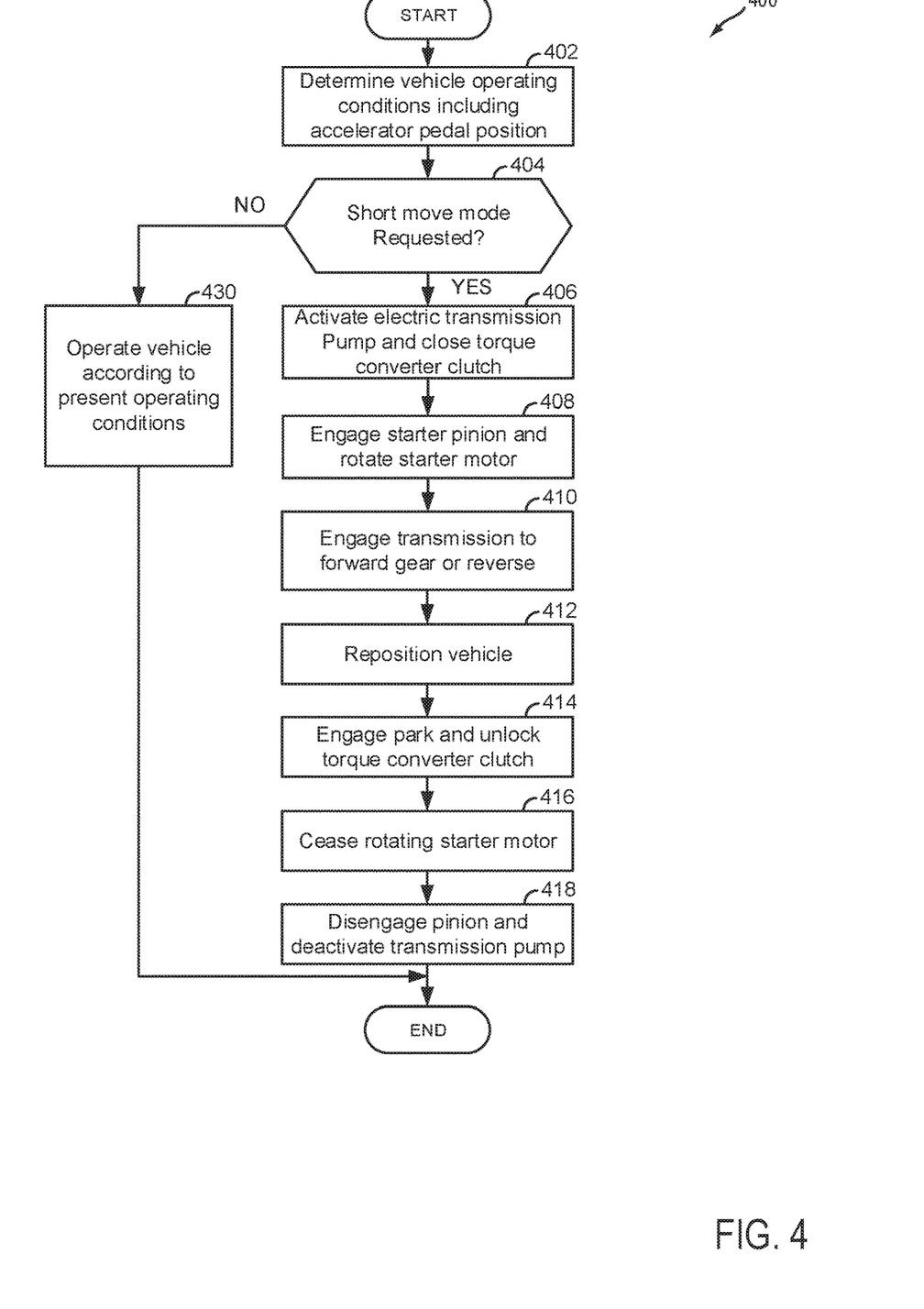
FIG. 4 shows a method for operating a vehicle.

Referring now to FIG. 3, plots of a prophetic vehicle operating sequence according to the method of FIG. 4 and the system of FIGS. 1 and 2 are shown. The plots are aligned in time and occur at a same time. The vertical lines at t0-t6 show particular times of interest. The // marks indicate a break in time and the break may be long or short in duration.

The first plot from the top of FIG. 3 is a plot of a vehicle short moving mode state versus time. Trace 310 is at a lower level near the horizontal axis when the vehicle is not operating in a vehicle short moving mode state. Trace 310 is at a higher level near the vertical axis arrow when the vehicle is operating in a vehicle short moving mode state. The vehicle may be propelled via the starter motor engaging the engine when the vehicle is operated in the vehicle short moving mode state. The vehicle may be propelled solely via the starter motor when the vehicle is operated in the vehicle short moving mode state. The vehicle may be propelled by the starter for a predetermined distance (e.g., less than 50 meters) via the starter when the vehicle is operated in the vehicle short moving mode state. The horizontal axis represents time and time increases from the left side of the plot to the right side of the plot. The horizontal axis represents time and the time increases from the left side of the figure to the right side of the figure. Trace 302 represents the vehicle short moving mode state.

The second plot from the top of FIG. 3 is a plot starter pinion state versus time. The starter pinion is advanced to engage the starter's pinion gear to the flywheel ring gear when trace 304 is at a higher level near the vertical axis arrow. The starter pinion is withdrawn such that the pinion gear does not engage the flywheel ring gear when trace 304 is at a lower level near the horizontal axis. The horizontal axis represents time and the time increases from the left side of the figure to the right side of the figure. Trace 304 represents the starter pinion state.

The third plot from the top of FIG. 3 is a plot of an electric transmission pump operating state versus time. The electric transmission pump is activated when trace 306 is at a higher level near the vertical axis arrow. Electric transmission pump operation is stopped when trace 306 is at a lower level near the horizontal axis. The horizontal axis represents time and the time increases from the left side of the figure to the right side of the figure. Trace 306 represents the electric transmission pump operating state.

The fourth plot from the top of FIG. 3 is a plot of transmission gear state (e.g., which transmission gear is engaged) versus time. The transmission is engaged in park when trace 308 is at the level of the letter P along the vertical axis. The transmission is engaged in 1st gear when trace 308 is at the level of the numeral 1 along the vertical axis. The transmission is engaged in reverse when trace 308 is at the level of the letter R along the vertical axis. The horizontal axis represents time and the time increases from the left side of the figure to the right side of the figure. Trace 308 represents the transmission gear state.

The fifth plot from the top of FIG. 3 is a plot of torque converter clutch state versus time. The torque converter clutch is fully closed when trace 310 is at a higher level near the vertical axis arrow. The torque converter clutch is fully open when trace 310 is near the level of the horizontal axis. The horizontal axis represents time and the time increases from the left side of the figure to the right side of the figure. Trace 310 represents the torque converter clutch state.

The sixth plot from the top of FIG. 3 is a plot of starter motor state versus time. The starter motor is activated and rotating when trace 312 is at a higher level near the vertical axis arrow. The starter motor is not activated and not rotating when trace 312 is near the level of the horizontal axis. The horizontal axis represents time and the time increases from the left side of the figure to the right side of the figure. Trace 312 represents the starter motor operating state.

At time t0, the engine is stopped (e.g., not combusting fuel and not rotating) (not shown) and there is no request to operate the vehicle in a short move mode where the vehicle is moved by engaging the starter pinion to the engine flywheel ring gear and rotating the engine via the starter. The pinion is not advanced and the electric transmission pump is not activated. The transmission is in park and the torque converter clutch is open. The starter motor is not rotating. Such conditions may be present when the vehicle is stopped.

At time t1, the engine is remains stopped (not shown) and a request to operate the vehicle in a short move mode where the vehicle is moved by engaging the starter pinion to the engine flywheel ring gear and rotating the engine via the starter is asserted. The electric transmission pump and the starter motor are activated in response to entering the short move mode. The pinion is not advanced, but the pinion is advanced shortly after time t1 so that the engine may be rotated via the starter. The transmission remains in park, but the transmission is shifted into first gear shortly after time t1 after the electric pump builds line pressure within the transmission, which enables the transmission's clutches to close and engage first gear. The torque converter clutch is also closed shortly after time t1. In this way, the vehicle may prepare to move to a new position without starting the engine.

Between time t1 and time t2, the starter rotates the engine crankshaft and the engine's crankshaft rotates the transmission input shaft via the fully closed torque converter clutch. The starter motor speed may be regulated by a human driver via the accelerator pedal, or alternatively, the starter motor speed may be regulated via the vehicle controller during conditions where the vehicle operates autonomously. The starter pinion remains engaged so that the pinion gear engages the flywheel ring gear (not shown) so that the starter motor may rotate the engine. The transmission remains engaged in first gear and the torque converter clutch remains fully closed.

At time t2, the vehicle reaches its destination (not shown) and the request for the vehicle short move mode is withdrawn. The starter motor is deactivated and the starter pinion remains engaged, but the starter pinion is disengaged shortly after time t2. The transmission is shifted from first gear to park. The torque converter clutch is unlocked and the electric transmission pump remains activated.

At time t3, the electric transmission pump is deactivated and the transmission remains engaged in park. The starter motor is not activated. The vehicle is not in short move mode and the pinion is withdrawn from engaging the pinion gear to the flywheel ring gear. The torque converter clutch is fully opened.

Between time t3 and time t4, a break in time occurs and the engine is stopped (not shown) on the right side of the break. The vehicle is not operating in the short move mode just to the right of the time break. In addition, the pinion is not advanced and the electric transmission pump is not activated just to the right of the time brake. The transmission is in park and the torque converter clutch is open. The starter motor is not rotating. Such conditions may be present when the vehicle is stopped.

At time t4, the engine is remains stopped (not shown) and a request to operate the vehicle in a short move mode where the vehicle is moved by engaging the starter pinion to the engine flywheel ring gear and rotating the engine via the starter is asserted. The electric transmission pump and the starter motor are activated in response to entering the short move mode. The pinion is not advanced, but the pinion is advanced shortly after time t4 so that the engine may be rotated via the starter. The transmission remains in park, but the transmission is shifted into reverse gear shortly after time t4 after the electric pump builds line pressure within the transmission, which enables the transmission's clutches to close and engage reverse gear. The torque converter clutch is also closed shortly after time t4. In this way, the vehicle may prepare to move to a new position without starting the engine in reverse gear.

Between time t4 and time t5, the starter rotates the engine crankshaft and the engine's crankshaft rotates the transmission input shaft through the fully closed torque converter clutch. The starter motor speed may be regulated by a human driver via the accelerator pedal, or alternatively, the starter motor speed may be regulated via the vehicle controller during conditions where the vehicle operates autonomously. The starter pinion remains engaged so that the pinion gear engages the flywheel ring gear (not shown) so that the starter motor may rotate the engine. The transmission remains engaged in reverse gear and the torque converter clutch remains fully closed.

At time t5, the vehicle reaches its destination (not shown) and the request for the vehicle short move mode request is withdrawn. The starter motor is deactivated and the starter pinion remains engaged, but the starter pinion is disengaged shortly after time t5. The transmission is shifted from reverse gear to park, the transmission may be shifted via a human driver or autonomously. The torque converter clutch is unlocked and the electric transmission pump remains activated.

At time t6, the electric transmission pump is deactivated and the transmission remains engaged in park. The starter motor is not activated. The vehicle is not in short move mode and the pinion is withdrawn from engaging the pinion gear to the flywheel ring gear. The torque converter clutch is fully opened.

Thus, a vehicle may be moved in a forward gear or a reverse gear via a starter motor and closing a torque converter clutch. The vehicle may be moved via a human or autonomous driver. In addition, the vehicle's transmission may be shifted via a human driver or via an autonomous driver (e.g., a vehicle system controller).

Referring now to FIG. 4, a flow chart of a method for operating a vehicle to enable vehicle movement of a non-hybrid vehicle is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to vehicle speed, engine speed, engine temperature, electric energy storage device state of charge (SOC), and accelerator pedal position. Method 400 proceeds to 404.

At 404, method 400 judges if a vehicle short move is requested. A vehicle short move mode may be requested when the vehicle's internal combustion engine is not activated (e.g., combusting fuel and rotating). A vehicle short move mode may be requested via a human driver or an autonomous driver. The vehicle short move mode may be entered after being requested if selected vehicle conditions are met. For example, method 400 may require that battery state of charge (SOC) is greater than a threshold SOC for entry into vehicle short move mode. Method 400 may also require that the engine is not running (e.g., not combusting fuel). Vehicle short move mode may be requested when the internal combustion engine is degraded, if the vehicle is being repositioned to attach a trailer, repositioned to a nearby parking location, or similar conditions. If method 400 judges that a vehicle short move mode is requested and conditions are met to enter vehicle short move mode, then the answer is yes and method 400 proceeds to 406. Otherwise, the answer is no and method 400 proceeds to 430.

At 430, method 400 commands the engine and TCC responsive to vehicle operating conditions including, but not limited to accelerator pedal position, vehicle speed, engaged transmission gear, and battery state of charge as is known in the art. Method 400 proceeds to exit.

At 406, method 400 activates the electric transmission pump and increases transmission line pressure so that transmission clutches may be closed, thereby activating a gear in the transmission (e.g., reverse or first gear). Further, method 400 fully closes and locks the torque converter clutch. Method 400 proceeds to 408.

At 408, method 400 advances the starter pinion to engage the pinion gear to the engine flywheel ring gear. Further, method 400 activates and begins to rotate the starter motor without supplying spark and fuel to the motor. The starter motor is activated via supplying electrical power to the starter motor. The speed that the starter motor rotates may be a function of accelerator pedal position or a speed that is requested via an autonomous driver. For example, starter motor speed may be increased in response to an increasing accelerator pedal position (e.g., an applied accelerator pedal) and starter motor speed may be decreased in response to a decreasing accelerator pedal position. The starter motor may be rotated until the vehicle reaches its final destination or until battery SOC is less than a threshold. Further, the starter motor may rotate the engine such that the vehicle is permitted to move less than a threshold distance (e.g., 50 meters) in some examples so that the engine may be restarted at a later time. Method 400 proceeds to 410.

At 410, method 400 shifts the transmission to a forward gear or a reverse gear. The transmission may be requested to change gears from park or neutral to reverse or first gear. Alternatively, if the vehicle is driven by a human, the human may change the transmission gear to facilitate vehicle movement. Method 400 proceeds to 412.

At 412, method 400 repositions the vehicle. The vehicle may be repositioned (e.g., moved to a different location than its initial location) via a human driver or an autonomous driver. If the vehicle is being driven via an autonomous driver, then the autonomous driver may reposition the vehicle applying the vehicle's various sensors. A request to exit vehicle short move mode may be generated when the vehicle reaches its destination or if battery SOC is less than a threshold. Method 400 proceeds to 414.

At 414, method 400 engages the transmission into park, or alternatively neutral after the vehicle is in its destination. The transmission may be shifted into park via the vehicle system controller or a human driver. In addition, the torque converter clutch is fully opened via the transmission controller. Method 400 proceeds to 416.

At 416, method 400 ceases to rotate the starter. Starter rotation may be ceased via stopping electric current flow to the starter motor. Method 400 proceeds to 418.

At 418, method 400 method 400 returns the starter pinion to disengage the pinion gear from the engine flywheel ring gear. In addition, the transmission electric pump is deactivated to conserve electrical power. Method 400 proceeds to exit.

In this way, the vehicle may be repositioned via a starter motor without starting an internal combustion engine. The starter motor may rotate the engine via engaging a pinion gear to a ring gear of a flywheel. This mode of operation may reduce engine emissions and fuel consumption.

Thus, the method of FIG. 4 provides for a vehicle operating method, comprising: adjusting a position of a starter pinion and closing a torque converter clutch via a controller in response to a request to move a vehicle without starting an engine of the vehicle. The method includes where adjusting the position of the starter pinion includes moving the pinion from a position here a pinion gear does not engage a flywheel to a position where the pinion gear engages the flywheel of the engine. The method includes where closing the torque converter clutch fully closes the torque converter clutch.

In some examples, the method includes where the torque converter clutch couples a torque converter impeller of a torque converter to a torque converter turbine, the torque converter positioned between an engine and a step ratio transmission. The method further comprises entering a vehicle short move mode in response to the request to move the vehicle without starting the engine of the vehicle. The method further comprises rotating a starter motor in response to the request to move the vehicle without starting the engine of the vehicle. The method includes where the starter motor is coupled to the pinion gear, and further comprising adjusting a speed of the starter motor responsive to accelerator pedal position. The method further comprises adjusting the position of the starter pinion and closing of the torque converter clutch in further response to a battery state of charge being greater than a threshold.

The method of FIG. 4 also provides for a vehicle operating method, comprising: adjusting a position of a starter pinion via a controller in response to a request to move a vehicle without starting an engine of the vehicle; and activating or maintaining activation of an electric transmission pump in response to the request to move the vehicle without starting the engine of the vehicle. The method includes where an engine of the vehicle is not combusting fuel when adjusting the position of the starter pinion. The method further comprises rotating the engine without supplying spark and fuel to the engine. The method further comprises closing a torque converter clutch in response to a request to move the vehicle without starting the engine of the vehicle. The method includes where the engine is rotated via a pinion gear, the pinion gear coupled to the starter pinion. The method further comprises ceasing to rotate the engine via the pinion gear and withdrawing the pinion gear from a flywheel in response to the request to move the vehicle being withdrawn. The method further comprises adjusting the position of the starter pinion and closing of the torque converter clutch in further response to a battery state of charge being greater than a threshold.

In another representation, the method of FIG. 4 provides for a vehicle operating method, comprising: adjusting a position of a starter pinion and closing a torque converter clutch via a controller in response to a request to move a vehicle without starting an engine of the vehicle; and engaging a gear of a transmission in response to the request to move a vehicle without starting an engine of the vehicle. The method includes where gear is first gear. The method includes where the gear is reverse. The method further comprises engaging park in response to the request to move the vehicle without starting the engine being withdrawn. The method also provides for adjusting a speed of a starter in response to accelerator pedal position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A vehicle operating method, comprising:
    adjusting a position of a starter pinion and closing a torque converter clutch via a controller in response to a request to move a vehicle without starting an engine of the vehicle; and
    where closing the torque converter clutch fully closes the torque converter clutch; and/or
    where the torque converter clutch couples a torque converter impeller of a torque converter to a torque converter turbine, the torque converter positioned between an engine and a step ratio transmission; and/or
    where the method further comprises rotating a starter motor in response to the request to move the vehicle without starting the engine of the vehicle; and/or
    where the method further comprises adjusting the position of the starter pinion and closing of the torque converter clutch in further response to a battery state of charge being greater than a threshold.

2. The method of claim 1, where adjusting the position of the starter pinion includes moving the pinion from a position where a pinion gear does not engage a flywheel to a position where the pinion gear engages the flywheel of the engine.

3. The method of claim 1, further comprising entering a vehicle short move mode in response to the request to move the vehicle without starting the engine of the vehicle.

4. The method of claim 1, where the starter motor is coupled to the pinion gear, and further comprising adjusting a speed of the starter motor responsive to accelerator pedal position.

5. A vehicle operating method, comprising:
    adjusting a position of a starter pinion via a controller in response to a request to move a vehicle without starting an engine of the vehicle; and
    activating or maintaining activation of an electric transmission pump in response to the request to move the vehicle without starting the engine of the vehicle.

6. The method of claim 5, where an engine of the vehicle is not combusting fuel when adjusting the position of the starter pinion.

7. The method of claim 6, further comprising rotating the engine without supplying spark and fuel to the engine.

8. The method of claim 7, further comprising closing a torque converter clutch in response to a request to move the vehicle without starting the engine of the vehicle.

9. The method of claim 8, where the engine is rotated via a pinion gear, the pinion gear coupled to the starter pinion.

10. The method of claim 9, further comprising ceasing to rotate the engine via the pinion gear and withdrawing the pinion gear from a flywheel in response to the request to move the vehicle being withdrawn.

11. The method of claim 5, further comprising adjusting the position of the starter pinion and closing of the torque converter clutch in further response to a battery state of charge being greater than a threshold.

12. A system, comprising:
    an engine including a starter, the starter including a pinion and a pinion gear;
    a torque converter including a torque converter clutch, the torque converter coupled to the engine; and
    a controller including executable instructions stored in non-transitory memory to adjust a position of the pinion of the starter in response to a request to move a vehicle a short distance without starting the engine; and
    where the engine is rotated via the starter; and/or
    where the system further comprises additional instructions to activate an electric pump of a transmission in response to the request to move the vehicle a short distance without starting the engine.

13. The system of claim 12, further comprising additional instructions to rotate the engine without supplying fuel to the engine while the pinion is engaging the pinion gear to a flywheel ring gear.

14. The system of claim 12, further comprising adjusting the position of the pinion of the starter in response to a request to end the move of the vehicle.

* * * * *